United States Patent
Hamer et al.

(10) Patent No.: US 11,301,721 B2
(45) Date of Patent: Apr. 12, 2022

(54) METHOD AND SYSTEM FOR TRAINING AND UPDATING A CLASSIFIER

(71) Applicant: Continental Automotive GmbH, Hannover (DE)

(72) Inventors: Henning Hamer, Munich (DE); Robert Thiel, Munich (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 39 days.

(21) Appl. No.: 16/954,099

(22) PCT Filed: Dec. 15, 2017

(86) PCT No.: PCT/EP2017/083122
§ 371 (c)(1),
(2) Date: Jun. 15, 2020

(87) PCT Pub. No.: WO2019/114991
PCT Pub. Date: Jun. 20, 2019

(65) Prior Publication Data
US 2021/0182608 A1    Jun. 17, 2021

(51) Int. Cl.
*G06K 9/62* (2006.01)
*G06K 9/00* (2022.01)

(52) U.S. Cl.
CPC ....... *G06K 9/6256* (2013.01); *G06K 9/00805* (2013.01); *G06K 9/00818* (2013.01)

(58) Field of Classification Search
None
See application file for complete search history.

(56) References Cited

U.S. PATENT DOCUMENTS

| | | | |
|---|---|---|---|
| 2015/0199617 A1 | 7/2015 | Kuwajima | 706/20 |
| 2021/0179117 A1* | 6/2021 | Glazman | B60H 1/00742 |

FOREIGN PATENT DOCUMENTS

| | | | |
|---|---|---|---|
| CN | 105 930 830 | 9/2016 | G06X 9/00 |
| JP | 2005309920 A | 11/2005 | G06K 9/62 |
| JP | 2015135552 A | 7/2015 | G06N 3/08 |

OTHER PUBLICATIONS

Search Report for International Application No. PCT/EP2017/083122, 17 pages, dated Oct. 22, 2018.
Avik Ghose et al., "Road Condition Monitoring and Alert Application . . . " *Pervasive Computing and Communications Workshops*, Perkom Demos 2012, pp. 489-491, Mar. 19, 2012.
Ali Sharif Razavian et al., "CNN Features Off-the Shelf: An Astounding Baseline for Recognition" *Royal Institute of Technology*, 8 pages, May 12, 2014.
Japanese Office Action, Application No. 2020532666, 5 pages, dated Sep. 27, 2021.

* cited by examiner

*Primary Examiner* — Leon Flores
(74) *Attorney, Agent, or Firm* — Slayden Grubert Beard PLLC (57) ABSTRACT

Various embodiments of the teachings herein include a method for training and updating a backend-side classifier comprising: receiving, in a backend-device, from at least one vehicle, classification data along with a respective classification result generated by a vehicle-side classifier; and training the backend-side classifier using the classification data and, if available, a corrected respective classification result as annotation.

13 Claims, 4 Drawing Sheets

METHOD AND SYSTEM FOR TRAINING AND UPDATING A CLASSIFIER

CROSS-REFERENCE TO RELATED APPLICATIONS

This application is a U.S. National Stage Application of International Application No. PCT/EP2017/083122 filed Dec. 15, 2017, which designates the United States of America, the contents of which are hereby incorporated by reference in their entirety.

TECHNICAL FIELD

The present disclosure relates to classifiers. Various embodiments may include methods for training and updating a classifier, e.g., a method for training and updating a backend-side classifier.

BACKGROUND

Advanced driver assistance systems may rely on classification of elements of camera images acquired by a camera mounted on or in a vehicle. Classification can be achieved by trainable classifiers such as neural networks. Generally, classifiers are trained using a number of positive or negative input samples with the goal of yielding a desired classification result. Classifiers may be specifically trained on camera images to realize the automatic recognition of elements of a certain class in camera images. Accordingly, pedestrians, vehicles, traffic signs etc. can be recognized. Applying trained classifiers on images delivered by cameras in vehicle may enable many use cases like automatic driving, collision avoidance, etc. Classifiers may be trained offline. Given a number of samples with manual annotation, a classifier tries to learn characteristics of the input samples to correctly discriminate positive from negative samples, e.g. samples belonging to a certain class.

One popular classification method is to use neural networks. Recently a method for fine tuning neural networks has been proposed which allows retrospective adaption of previously trained classifiers. For this purpose new training examples are used for re-training which means adapting weights within the classifier. However, appropriate training samples need to be identified and to be distributed to vehicle-side classifiers. Manual identification of appropriate training samples and manual annotation may be time consuming and costly.

SUMMARY

The teachings of the present disclosure may be used to overcome the drawbacks mention above. For example, some embodiments of the teachings herein include a method for training and updating a backend-side classifier, the method comprising: receiving, in a backend-device, from at least one vehicle, classification data along with a respective classification result generated by a vehicle-side classifier; and training the backend-side classifier using the classification data and a possibly corrected respective classification result as annotation.

In some embodiments, training the backend-side classifier comprises: comparing classification results for the same classification object received from a plurality of vehicles; if the classification results differ, applying a consistency check on the classification results to determine an inconsistent or false classification result; and training the backend-side classifier only using consistent annotations based on the consistency check.

In some embodiments, the method includes communicating a consistent annotation back to a vehicle in which an inconsistent or false classification result originates.

In some embodiments, the method includes initiating an update of the vehicle-side classifier of the vehicle in which the inconsistent or false classification result originates based on the consistent annotation.

In some embodiments, applying a consistency check on the classification results comprises applying a voting scheme for classification results for the same classification object and setting the classification result that has been voted for by the voting scheme as a consistent annotation for the classification object.

In some embodiments, applying a consistency check on the classification results comprises annotating the classification data by a manual annotator.

In some embodiments, training the backend-side classifier comprises updating the backend-side classifier.

In some embodiments, the backend-side classifier and the vehicle-side classifier is a multi-layer classifier having a plurality of layers and wherein the classification data is an output of a specific layer of the plurality of layers.

In some embodiments, training the backend-side classifier comprises updating a number of layers corresponding to the specific layer of the plurality of layers.

In some embodiments, the method includes: determining, in a vehicle, an inconsistent or false classification result; generating, in the vehicle, an indication indicating that the classification is inconsistent or false; receiving, in a backend-device, along with the classification data and the classification result the indication that the classification is inconsistent or false; determining, by the backend-device, a correct classification result with respect to the classification data; communicating, by the backend-device; the classification data and the correct classification result to the vehicle or another vehicle; and initiating, by the backend-device; a training of the vehicle-side classifier of the vehicle or the other vehicle based on the classification data and the determined correct classification result as annotation.

In some embodiments, the method includes: determining, in a vehicle, an inconsistent or false classification result; generating, in the vehicle, an indication indicating that the classification is inconsistent or false; receiving, in a backend-device, along with the classification data and the classification result the indication that the classification is inconsistent false; determining, by the backend-device, a correct classification result with respect to the classification data; and initiating, by the backend-device; a training of the backend-side classifier based on the classification data and the determined correct classification result as annotation.

In some embodiments, the method includes: determining, in a vehicle, an inconsistent or false classification result for a classification object; generating, in the vehicle, an indication indicating that the classification is inconsistent or false; receiving, in a backend-device, along with the classification data and the classification result the indication that the classification is inconsistent false; communicating, by the backend-device, the classification data to a plurality of other vehicles; initiating, by the backend-device, a classification of the classification data by the vehicle-side classifier of each of the plurality of other vehicles; receiving, by the backend-device, classification results from the plurality of other vehicles; applying a voting scheme for the classification results and setting the classification result that the voting scheme has been voted for as a consistent annotation for the classification object; communicating, by the backend-device, the consistent annotation to the vehicle or another vehicle; and initiating, by the backend-device; a training of the vehicle-side classifier of the vehicle or another vehicle based on the classification data and the determined consistent annotation for the classification object.

As another example, some embodiments include a backend-device comprising: a receiver configured to receive classification data along with a respective classification result generated by a vehicle-side classifier of at least one vehicle; and one or more processors configured to implement a backend-side classifier and configured to train the backend-side classifier using the classification data and a possibly corrected respective classification result as annotation.

In some embodiments, the one or more processors are configured to compare classification results for the same classification object received from a plurality of vehicles; and if the classification results differ, to apply a consistency check on the classification results to determine an inconsistent or false classification result; and to train the backend-side classifier only using consistent annotations based on the consistency check.

As another example, some embodiments include a system comprising a backend-device as described above and one or more vehicles each comprising a vehicle side classifier; wherein the backend-device is further configured to communicate a consistent annotation back to a vehicle in which an inconsistent or false classification result originates and wherein the backend-device is further configured to initiate an update of the vehicle-side classifier of the vehicle in which the inconsistent or false classification result originates based on the consistent annotation.

BRIEF DESCRIPTION OF THE DRAWINGS

Different embodiments of the teachings of the present disclosure are shown in the drawings and will be described and discussed below. Therein.

DETAILED DESCRIPTION

Various embodiments of the teachings of the present disclosure relate to methods for updating and training a backend-side classifier. In some embodiments, the method includes receiving, in a backend-device, from at least one vehicle classification data along with a respective classification result generated by a vehicle-side classifier and training the backend-side classifier using the classification data and a possibly corrected respective classification result as annotation. Accordingly, the backend-side classifier is trained or fine-tuned based on the result of a pre-trained vehicle-side classifier. Classification results and the underlying classification data are sent to the backend by one or more vehicles.

Classification data may be any type of input data such as raw data or pre-processed data necessary for classification and training. Pre-processed data may include the output of any stage or multi-stage classifier. Specifically, classification data may include raw data, e.g. raw camera images, acquired by a vehicle. The classification results of the pre-trained vehicle-side classifiers may be used as annotation for training the backend-side classifier, either from scratch or by updating the parameters, e.g. weights in case of a neural network. In order to correctly train or update the backend-side classifier, consistent and correct annotations shall be used only. Therefore, a consistency check may be applied to the classification results that have been received by the backend and inconsistent or false classification results generated by the vehicle-side classifiers need be corrected. However, the classification data that resulted in an inconsistent or false classification result generated by a vehicle-side classifier may represent valuable training data as some vehicle-side classifiers may have correctly identified the classification object while others may have not.

Apparently, in this case the classification object may have properties that can only be identified by sophisticated, i.e. intensively trained classifiers. If an existing backend-side classifier is trained with such classification data, an improvement of the classification properties of the classifier can be expected. Thus, applying a consistency check to classification results received from a plurality of vehicle-side classifiers provides a technique to efficiently determine valuable training data. Therefore, the training data does not need to be chosen manually.

As above, training the backend-side classifier may include comparing classification results for the same classification object received from a plurality of vehicles in order to conduct a consistency check on the classification results. If the classification results differ a consistency check may be applied on the classification results to determine an inconsistent or false classification result. The backend-side classifier may then be trained only using consistent annotations based on the consistency check. A corrected classification result may thus be obtained by identifying a consistent classification result. The consistent classification result may be used as a consistent annotation for the respective classification data. The consistent annotation may be communicated back to the vehicle in which an inconsistent or false classification result originates. Based on the consistent annotation, the backend may initiate an update of the vehicle-side classifier of the vehicle in which the inconsistent or false classification result originates.

The classification object, e.g. a road sign, represented by the classification data, e.g. a camera image, may be communicated by one or more vehicles along with its geographical position. The backend, which determines a consistent and correct annotation of the classification object, may distribute the consistent and correct annotation along with the classification data and the geographical position to a plurality of vehicles, specifically to vehicles in the vicinity of the classification object. The geographical position may be coded by WGS 84.

Applying a consistency check on the classification results may include applying a voting scheme such as an automated backend-assisted voting system, for example majority vote, for classification results for the same classification object and setting the classification result for which the voting scheme has voted for, e.g. that won the majority vote, as a consistent annotation for the classification object represented by the classification data. For the consistency check classification results from different vehicle-side classifiers may be employed, e.g. classifiers of different type or classifiers of different origin.

In case of an even majority vote it may be necessary to employ manual annotation of the classification data. The backend may communicate the classification data to a service center in which a manual annotator annotates the classification data. A correct and consistent annotation may be retrieved by the backend from the service center. Classification data which has been originally false or inconsistent classified along with a corrected, i.e. corrected and consistent annotation, may be used to train the backend-side classifier. The backend-side classifier may be trained by updating.

As described above, the consistency check may be done in the backend. However, in order to save communication resources, a consistency check may be done in a vehicle. For this purpose, a vehicle may have two classifiers of different type. If the two classifiers within the same vehicle yield different classification results, thus classification data valuable for training a classifier may have been identified and be communicated to the backend. Moreover, in case of an inconsistency of the classification results, a vehicle may not be able to determine a correct classification of the respective classification object represented by the classification data. The vehicle may make use of the backend to obtain a correct classification. Thus a correct and consistent annotation may generated by the backend which can be used to update the vehicle-side classifier that has generated the incorrect classification result.

A vehicle that has determined an inconsistent or incorrect classification result may generate an indication that the classification is inconsistent or incorrect. The backend may receive along with the classification data and the classification result the indication that the classification is inconsistent or incorrect. Being triggered by this indication the backend may determine a correct classification based on the classification data, e.g. either by its own backend-side classifier or by a manual annotator. The backend-device may then communicate the classification data and the correct classification result to the vehicle or even another vehicle. Subsequently, the backend-device may initiate a training of the vehicle side classifier of the vehicle or even the other vehicle based on the classification data and the determined correct classification result annotation. Hence, valuable training data along with a correct annotation can be identified by identifying an inconsistent classification result of any vehicle-side classifier and rectifying it by a backend-device. Thus, an efficient way of identifying training data and making use of it to train vehicle-side classifiers has been presented.

However, it may not be necessary that the backend-device determines a consistent and correct classification result itself in order to provide a correct annotation for training a classifier. The backend-device may instead employ vehicle-side classifiers of other vehicles to determine a consistent and correct classification result. Accordingly, the backend-device, apart or instead from evaluating the classification data by itself, may communicate, upon receiving the indication that the classification is inconsistent, the classification data to a plurality of other vehicles. The backend-device may then initiate a classification of the classification data by the vehicle-side classifier of each of the plurality of other vehicles.

Upon completion of the classification, the backend-device may then receive classification results from the plurality of other vehicles and apply a voting scheme, e.g. a majority vote, for the classification results and set the classification result that won the voting scheme, e.g. the majority vote, as a consistent annotation for the classification object. The backend-device may communicate the consistent annotation to the vehicle or another vehicle. The backend-device may initiate a training of the vehicle-side classifier of the vehicle or another vehicle based on the classification data and the determined correct classification result as annotation.

The backend-side classifier does not necessarily need to be trained from scratch. Instead, existing classifiers can be used that are fine-tuned within the training. For example, a copy of a vehicle-side classifier can be present in the backend as a starting point for the backend-side classifier. As new and possibly consistent classifications arrive in the backend along with the respective classification data, the classification data along with a consistent, possibly corrected annotation, can be inserted into the backend-side classifiers to adapt the parameters, e.g. the weights, thus improving the classifiers. The improved backend-side classifier can then be redistributed to the vehicles, e.g. via over the air updates.

Any of the training schemes proposed above increase the variance within a training set. The overall training data set includes a plurality of classification data sets. Instead of sending classification data in the form of raw data, e.g. camera images, to the backend along with their classification result a more abstract representation may be uploaded to the backend. The backend-side classifier and the vehicle-side may be a multi-layer classifier having a plurality of layers. For example a neural network classifier consists of several layers, each layer containing perceptrons. The perceptrons contain the weights which define the classifier. For classification the raw data is inserted into the first layer. The data is then transformed as it moves through the different layers of the network with a final classification result as the output of the last layer. Instead of uploading raw data, the representation of the raw data at any layer may be uploaded.

For example, the output of layer 10 of the vehicle-side classifier may be uploaded and inserted into layer 11 of the respective backend-side classifier. Accordingly, the classification data is an output of specific layer of a plurality layers. Within the backend-side classifier only layers higher than the output layer of the vehicle-side classifier can be trained or updated. In other words, training the backend-side classifier includes updating a number of layers corresponding to the specific layer of the plurality of layers of the vehicle-side classifier. For fine tuning this is sufficient. It saves data to be communicated to the backend and thus communication resources such as bandwidth or time. Moreover, there are no privacy issues compared to uploading complete camera images. Therefore, user acceptance can be expected to be higher in contrast to solutions that affect privacy issues. Other abstract representations of the raw data may be communicated from a vehicle to the backend for classifier training, e.g. results from image processing like demosaicing and hand-crafted features like histogram of oriented gradient features.

The present disclosure further describes backend-devices that include a receiver configured to receive classification data along with a respective classification result generated by a vehicle-side classifier of at least one vehicle and one or more processors configured to implement a backend-side classifier and configured to train the backend-side classifier using the classification data and a possibly corrected respective classification result as annotation. The one or more processors may be configured to compare classification results for the same classification object received from a plurality of vehicles. If the classification results differ, the one or more processors are configured to apply a consistency check on the classification results to determine an inconsistent or false classification result; and to train the backend-side classifier only using consistent annotations based on the consistency check.

The present disclosure further describes systems including a backend-device as described above and one or more vehicles. Each vehicle includes a vehicle-side classifier. The backend-device may be further configured to communicate a consistent annotation back to a vehicle in which an inconsistent or false classification result originates. The backend-device may be further configured to initiate an update of the vehicle-side classifier of the vehicle in which the inconsistent or false classification result originates based on the consistent annotation.

Figure 1:
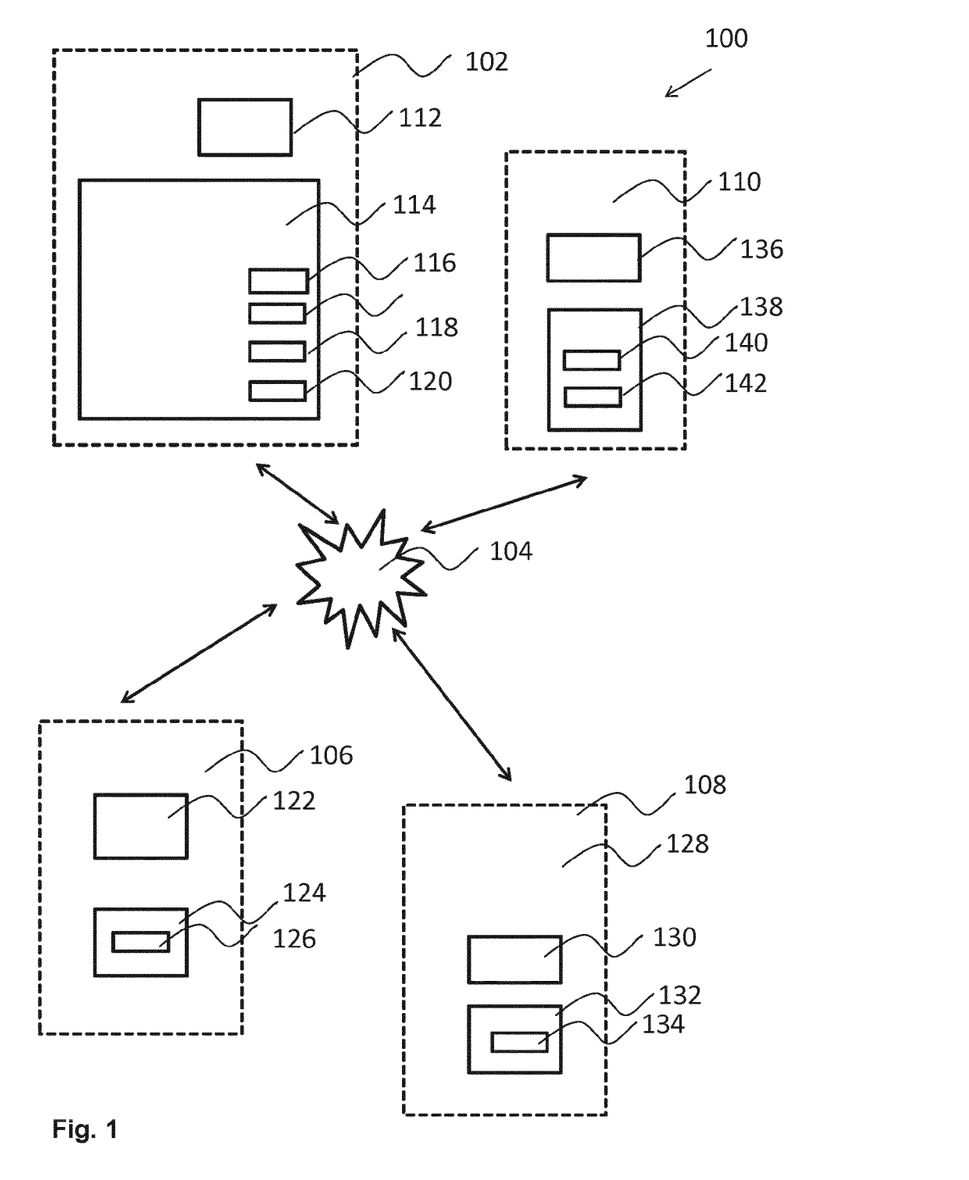
FIG. 1 shows a diagram showing a backend device and three vehicle-side classifiers incorporating teachings of the present disclosure.

FIG. 1 shows a block diagram of system 100 that includes backend-device 102 which is communicatively coupled to vehicle-device 106, vehicle-device 108 and vehicle-device 110 via communication network 104. The communication network 104 may be a wireless communication network based on communication standards such as Global System for Mobile Communications (GSM), Long Term Evolution (LTE) or 5G or any other network suitable for Car-to-X communications. Backend-device 102 includes a transceiver to receive data from or to send transmit to vehicle devices 106, 108, 110 via communication network 114. Backend-device 102 further includes processor 112 coupled to memory 114. Memory 114 stores a plurality of classifiers 116, 118, 120 implemented as software modules. Classifier 116 may be a vehicle-side stand-alone classifier. Classifier 118 may be classifier that represents a copy of a specific vehicle-side classifier, e.g. vehicle-side classifier 142. Classifier 120 may be a classifier that represents a copy of another specific vehicle-side classifier, e.g. of a second ordinary equipment manufacturer.

Vehicle device 106 in a first vehicle comprises a processor 122 coupled to a memory 124. Memory 124 stores vehicle-side classifier 126 implemented as a software module. Vehicle device 106 includes a transceiver for communication via communication network 104.

Vehicle device 108 in a second vehicle comprises processor 128 coupled to memory 128. Memory 128 stores vehicle-side classifier 130 implemented as a software module. Vehicle device 108 includes a transceiver for communication via communication network 104.

Vehicle device 110 in a third vehicle comprises processor 136 coupled to memory 138. Memory 138 stores vehicle-side classifier 140 and vehicle-side classifier 142, each implemented as a software module. Vehicle-side classifier 140 may be different from vehicle-side classifier 142, either in terms of its parameters or even in terms of its structure.

If vehicle-side classifiers 140 and 142 yield different classification results, vehicle device 110 itself can determine that the classification results are inconsistent. Inconsistent classification results may be an indication that the underlying classification data may be specifically valuable for training of classifiers, that is because only one of the classifier 140, 142 works correctly for that classification data. Such valuable classification data can be communicated to backend-device 102. For this purpose, vehicle device 110 includes a transceiver for communication via communication network 104.

System 100 only represents a specific embodiment. For example, the vehicle-side classifiers may be implemented as software modules running in a processor of an electronic control unit of a vehicle.

Standalone backend-side classifier 116 may be trained using training data, i.e. classification data collected from vehicles over communication network 104. In order to determine suitable, i.e. valuable, classification data, backend-device 102 collects classification data for classification objects for which different vehicle-side classifiers 124, 134, 140 and 142 yield different results. Training or updating the backend-side classifier 116 will be explained with reference to FIG. 2 which shows a flow graph of method 200 implemented in processor 112. Each of vehicle-side classifiers 126, 134, 140 and 142 may classify the same classification object, e.g. a road sign when vehicles that include vehicle devices 106, 108 and 110 drive by that classification object.

Figure 2:
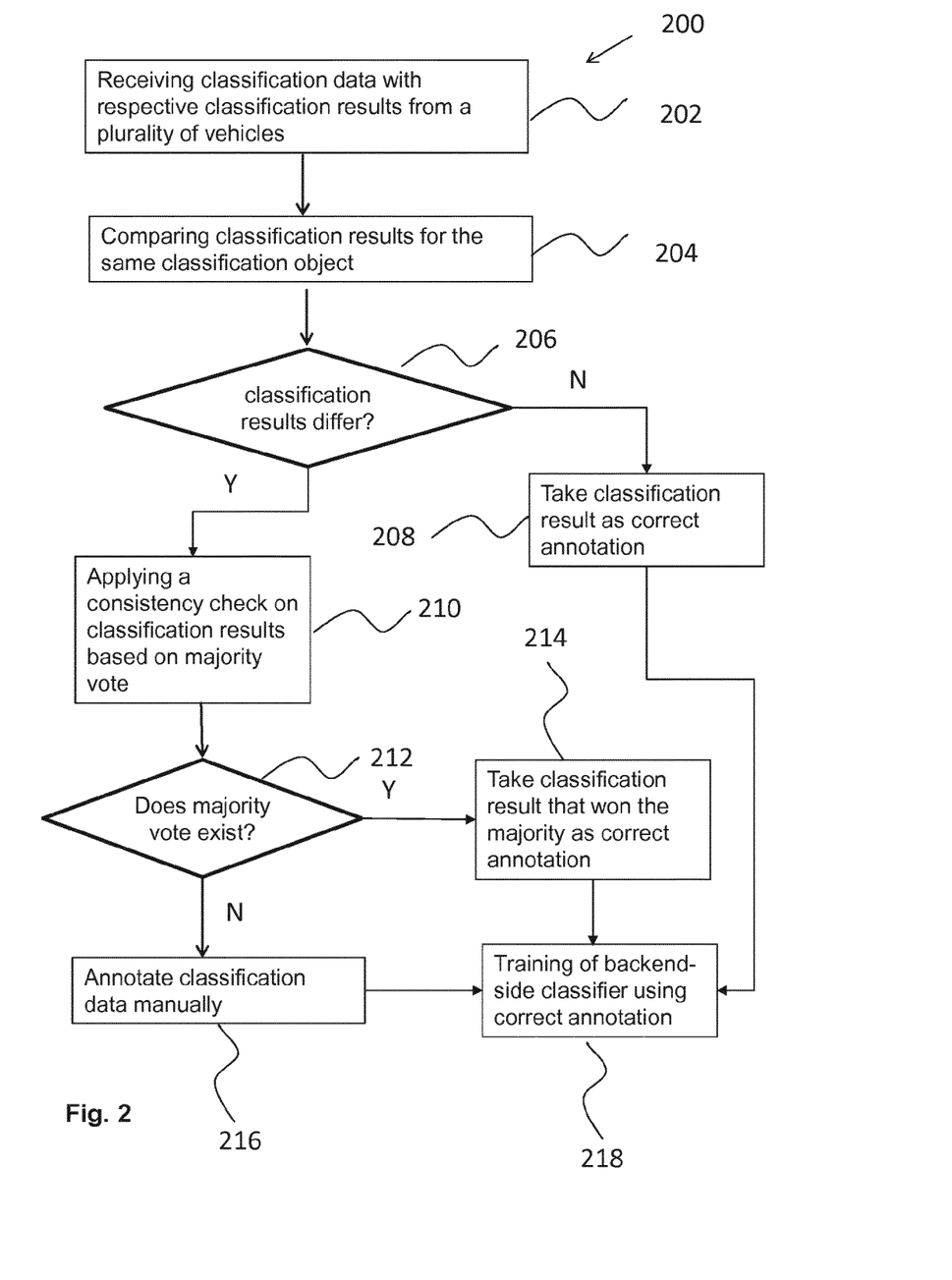
FIG. 2 shows a flow graph of a training method of a backend-side classifier using an annotation generated by a majority vote or manually initiated by the backend.

Backend-device 102 may initiate a data transfer by sending a request to vehicle devices 102, 106 and 108 via communication network 104. Alternatively, backend device 104 may continuously receive classification data of classification object along with respective classification results from a plurality of vehicles, e.g. the first vehicle, the second vehicle and the third vehicle, see stage 200.

Backend-device 102 may then compare the classification results for the same classification object, see stage 200. The classification object may be identified by its geographical position. For this purpose, the first, second and third vehicles may comprise means for determining the geographical position of a classification object, e.g. GPS or Radar.

Backend-device 102 may then determine whether the classification results differ, see stage 206. If the classification results do not differ, then the classification results are consistent and may be regarded as correct. They can be used as annotation of the classification data for training vehicle-side classifier 116. If the classification results differ, then backend-device 102 may apply a consistency check on the classification results based on a majority vote, see stage 210.

If a majority vote exists, e.g. three of the four classifiers 126, 134, 140 may have determined a specific classification object, while classifier 142 may have determined another classification object, then the classification results that have won the majority vote are taken as a correct annotation for the classification data, see stage 214. The classification data along with the thus determined correct annotation may be used to train the standalone-classifier 116 in the backend. However, apparently classifier 142 needs some improvement as it did not correctly classify the classification object. Therefore, the classification data along with the determined correct annotation may be communicated back to vehicle device 110. Backend-device 102 may initiate a training of vehicle side classifier 142. Alternatively backend-side classifier 118 may be a copy of vehicle-side classifier 142. Backend-device 102 may train backend-side classifier 120 based on the classification data and the determined correct annotation. When the training is complete, the updated parameters of vehicle-side classifier 120 may be communicated to vehicle-device 110 over the communication network. Vehicle-device 110 may then use the updated parameters to update vehicle-side classifier 142.

However, a majority may not exist, e.g. in the case of even results. For example vehicle-side classifiers 126 and 136 may have determined a specific classification object and vehicle-side classifiers 140 and 142 may have determined another classification object. In this case, a consistent annotation cannot be determined by a majority vote. In this case, backend-device 102 may employ other methods to determine a correct annotation, i.e. classification result for the classification object. As shown in stage 216, the classification data may be annotated manually. For this purpose, backend device 102 may communicate the classification data to an external server or service provide, where a manual annotator exists. The thus determined correct annotation may be used to train or update the backend-side standalone classifier 116. Backend-device 102 may initiate a training of vehicle side classifier 140 and 142 as those classifiers did not correctly classified the classification data in this case. Alternatively, backend-side classifier 118 may be a copy of vehicle-side classifier 140 and backend-side classifier 120 may be a copy of vehicle-side classifier 142. Backend-device 102 may train backend-side classifier 118 and backend-side classifier 120 based on the classification data and the determined correct annotation. When the training is complete, the updated parameters of vehicle-side classifier 118 and vehicle-side classifier 120 may be communicated to vehicle-device 110 over the communication network. Vehicle-device 110 may then use the updated parameters to update vehicle-side classifier 140 and vehicle-side classifier 142 respectively.

The method described above provides a technique for implicitly identifying training data sets suitable for training classifiers, i.e. classification data for which some classifiers generate correct classification results while other classifiers do not. However, it may be observed that the backend itself needs to identify the training data sets by applying a majority vote to classification results received from a plurality of vehicles.

Figure 3:
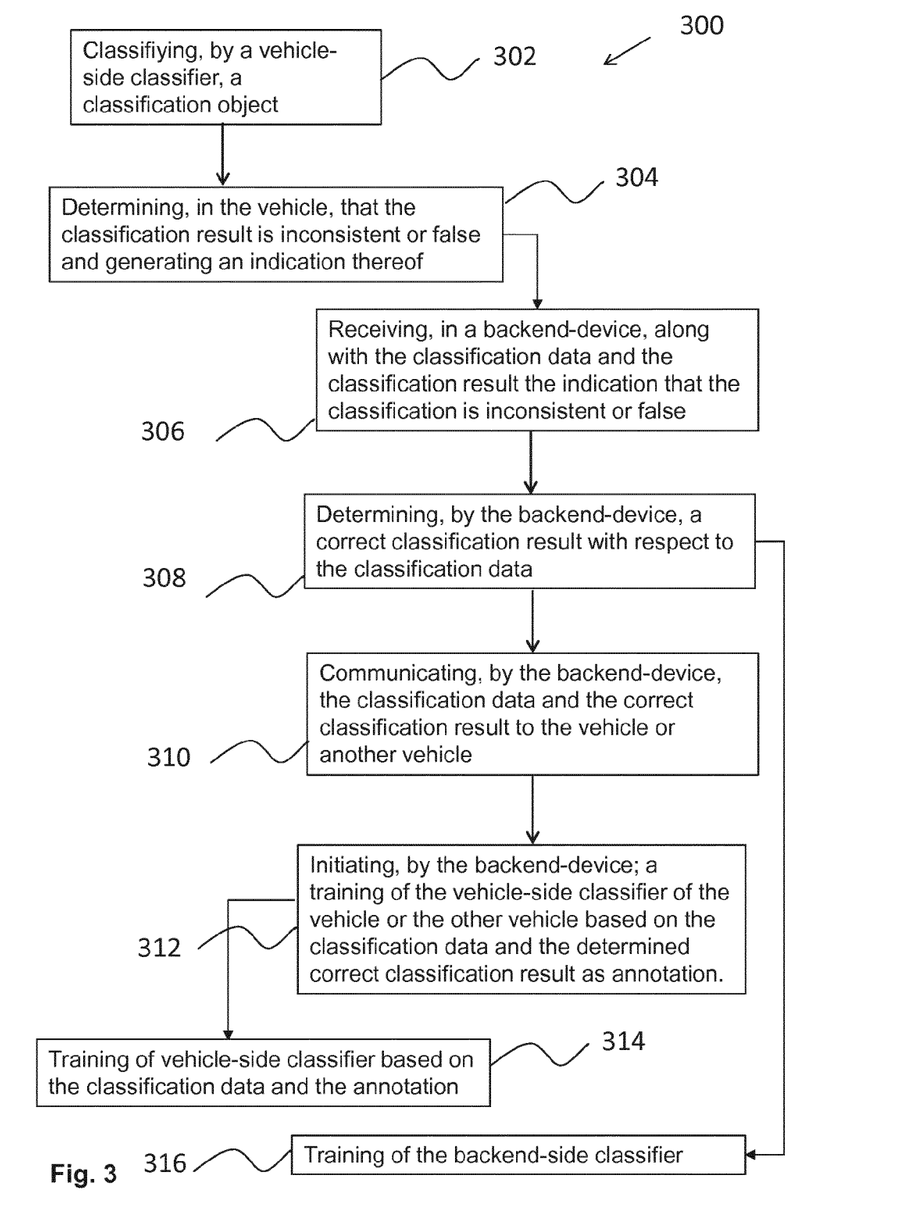
FIG. 3 shows a flow graph of a training method of a backend-side classifier and/or a vehicle side classifier initiated by a vehicle incorporating teachings of the present disclosure.

FIG. 3 shows a flow diagram of a method in which a suitable training data set is identified within the vehicle. A classification object may be classified by vehicle-side classifier 140 and vehicle-side classifier 142, see stage 302. The two classification results may be different, i.e. inconsistent. Accordingly, one or both classifiers may not have worked correctly. Vehicle device 110 may generate an indication that is has generated inconsistent classification results and may communicate this indication along with the classification data to backend-device 102 via communication network 104, see stage 306. Accordingly, the backend-device may save communication effort in order to find out whether a classification result is inconsistent or not using other vehicle-side classifiers because vehicle-device 110 determines the inconsistency by itself.

Up reception the indication that the classification result is inconsistent or false along with the respective classification data, see stage 306, backend-device 102 may determine a correct classification result, i.e. a correct and consistent annotation to the classification, see stage 308, e.g. by employing its own stand-alone classifier 116. Alternatively, backend-device 102 may employ a manual annotator or even vehicle-side classifiers of other vehicles accessible over communication network 104 as will be explained later with reference to FIG. 4.

Once backend-device 102 has determined a correct classification result, it may communicate the classification result along with the classification data back to vehicle-device 110. Additionally it may communication the classification data along with the correct classification result to any other vehicle device, e.g. vehicle device 106 and/or 108, see stage 310.

Backend-device 102 may the initiate a training of the vehicle-side classifiers 140 and 142 and additionally of vehicle-side classifiers 126 and 134, see stage 312, which can then be trained based on the classification data and the correct annotation, see stages 314 and 316, respectively. As above, one vehicle-device identified suitable and valuable training data that is annotated by the backend-device and the correct annotation along with the training data is distributed over the network to train vehicle-side classifiers of other vehicle devices.

Figure 4:
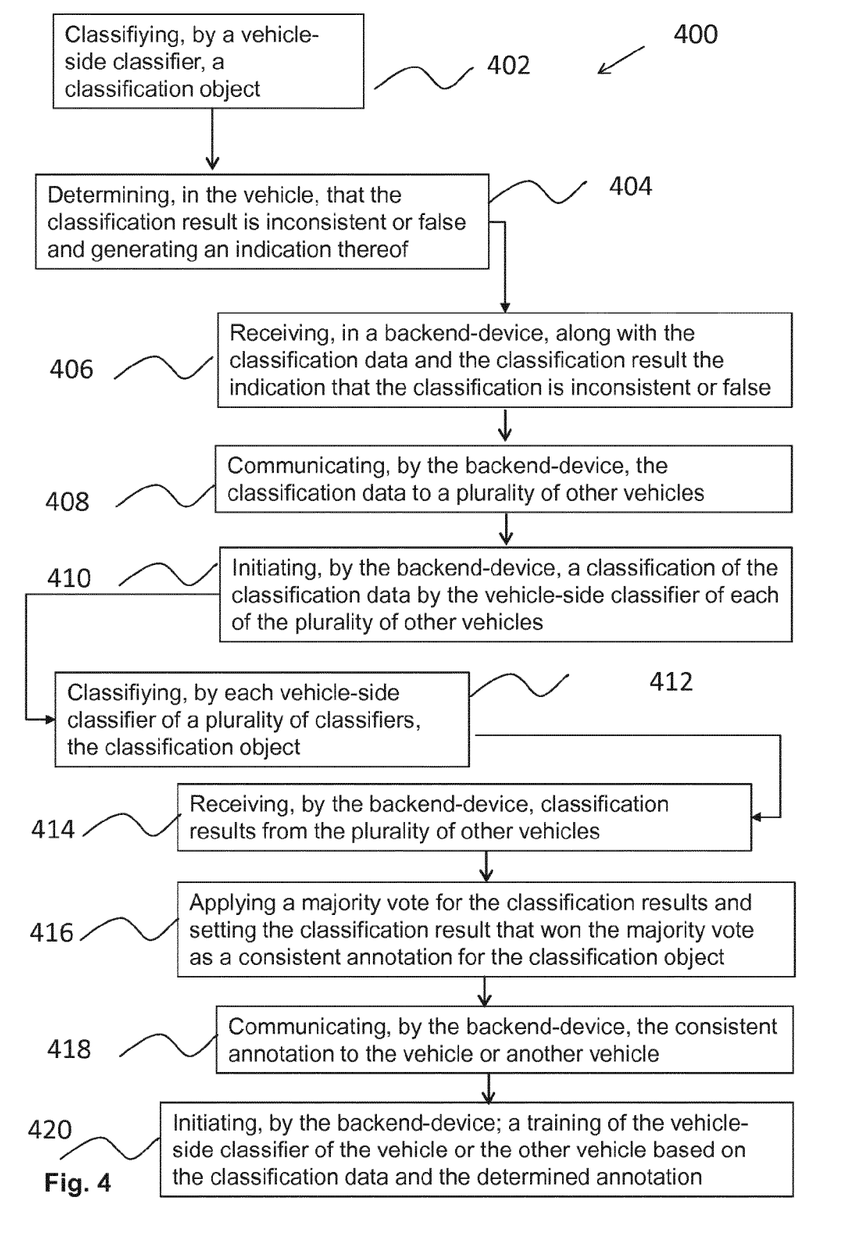
FIG. 4 shows a flow graph of a training method of a vehicle-side classifier using an annotation generated by a majority vote initiated by a vehicle incorporating teachings of the present disclosure.

FIG. 4 shows a flow diagram of a method in which a suitable training data set is identified within the vehicle and wherein a correct and classification result is identified by means of a plurality of vehicle-side classifiers. A classification object may be classified by vehicle-side classifier 140 and vehicle-side classifier 142, see stage 402. The two classification results may be different, i.e. inconsistent. Accordingly, one or both classifiers may not have worked correctly. Vehicle device 110 may generate an indication that is has generated inconsistent classification results and may communicate this indication along with the classification data to backend-device 102 via communication network 104, see stage 406. Accordingly, the backend-device may save communication effort in order to find out whether a classification result is inconsistent or not using other vehicle-side classifiers because vehicle-device 110 determines the inconsistency by itself.

Upon reception of the indication that the classification result is inconsistent or false along with the respective classification data, see stage 406, backend-device 102 may determine a correct classification result, i.e. a correct and consistent annotation to the classification by employing vehicle-side classifiers of other vehicles accessible over communication network 104. For this purpose, backend-device 102 may communicate the classification data to vehicle-devices 106 and 108 and other vehicle-devices not shown in FIG. 1, see stage 408.

Backend-device 102 may initiate a classification of the classification data by the vehicle-side classifier of each vehicle-device the classification data was communicated to, e.g. vehicle-side classifiers 126, 128 and others, see stage 410. Each vehicle-side classifier may then classify the classification object, see stage 412 and communicate the results back to backend-device 102. Backend-device 102 may then receive the classification results, see stage 412 and apply a majority vote to it, see stage 416. The classification result that won the majority vote as a consistent annotation for the classification object.

Backend-device 102 may then initiate a training of the vehicle-side classifier of vehicle-device 110 and possibly vehicle-side classifiers of other vehicles, see stage 420. Additionally backend-device 102 may train its own stand-alone-classifier 116 using the classification data and the consistent annotation. As above, one vehicle-device identified suitable and valuable training data that is annotated by employing other vehicle-side classifiers accessible over the communication network. The consistent, i.e. correct annotation along with the training data is distributed over the network to train vehicle-side classifiers of other vehicle devices.

In any of the above described scenarios, the classification data may be the output of a specific layer of a multi-layer classifier. Then, subsequent layers of other classifiers can be employed to determine a correct annotation. Also subsequent layer of other classifiers can be trained or updated using this type of classification data and the determined correct annotation. This way, some privacy issues are resolved with respect to data collection and processing thus promoting the acceptance of drivers.

What is claimed is:

1. A method for training and updating a backend-side classifier, the method comprising:

receiving, in a backend-device, from at least one vehicle, classification data along with a respective classification result generated by a vehicle-side classifier; and training the backend-side classifier using the classification data and, if available, a corrected respective classification result as annotation;

wherein training the backend-side classifier comprises:

comparing classification results for the same classification object received from a plurality of vehicles;

if the classification results differ, applying a consistency check on the classification results to determine an inconsistent or false classification result; and training the backend-side classifier only using consistent annotations based on the consistency check.

2. The method of claim 1, further comprising communicating a consistent annotation back to a vehicle in which an inconsistent or false classification result originates.

3. The method of claim 2, further comprising initiating an update of the vehicle-side classifier of the vehicle in which the inconsistent or false classification result originates based on the consistent annotation.

4. The method of claim 1, wherein applying a consistency check on the classification results comprises applying a voting scheme for classification results for the same classification object and setting the classification result that has been voted for by the voting scheme as a consistent annotation for the classification object.

5. The method of claim 1, wherein applying a consistency check on the classification results comprises annotating the classification data by a manual annotator.

6. The method of claim 1, wherein training the backend-side classifier comprises updating the backend-side classifier.

7. The method of claim 1, wherein the backend-side classifier and the vehicle-side classifier is a multi-layer classifier having a plurality of layers and wherein the classification data is an output of a specific layer of the plurality of layers.

8. The method of claim 7, wherein training the backend-side classifier comprises updating a number of layers corresponding to the specific layer of the plurality of layers.

9. A method for training and updating a backend-side classifier, the method comprising:

receiving, in a backend-device, from at least one vehicle, classification data along with a respective classification result generated by a vehicle-side classifier;

training the backend-side classifier using the classification data and, if available, a corrected respective classification result as annotation;

determining, in a vehicle, an inconsistent or false classification result;

generating, in the vehicle, an indication indicating that the classification is inconsistent or false;

receiving, in a backend-device, along with the classification data and the classification result the indication that the classification is inconsistent or false;

determining, by the backend-device, a correct classification result with respect to the classification data;

communicating, by the backend-device; the classification data and the correct classification result to the vehicle or another vehicle;

initiating, by the backend-device; a training of the vehicle-side classifier of the vehicle or the other vehicle based on the classification data and the determined correct classification result as annotation.

10. A method for training and updating a backend-side classifier, the method comprising:

receiving, in a backend-device, from at least one vehicle, classification data along with a respective classification result generated by a vehicle-side classifier;

training the backend-side classifier using the classification data and, if available, a corrected respective classification result as annotation;

determining, in a vehicle, an inconsistent or false classification result;

generating, in the vehicle, an indication indicating that the classification is inconsistent or false;

receiving, in a backend-device, along with the classification data and the classification result the indication that the classification is inconsistent false;

determining, by the backend-device, a correct classification result with respect to the classification data;

initiating, by the backend-device; a training of the backend-side classifier based on the classification data and the determined correct classification result as annotation.

11. A method for training and updating a backend-side classifier, the method comprising:

receiving, in a backend-device, from at least one vehicle, classification data along with a respective classification result generated by a vehicle-side classifier;

training the backend-side classifier using the classification data and, if available, a corrected respective classification result as annotation;

determining, in a vehicle, an inconsistent or false classification result for a classification object;

generating, in the vehicle, an indication indicating that the classification is inconsistent or false;

receiving, in a backend-device, along with the classification data and the classification result the indication that the classification is inconsistent false;

communicating, by the backend-device, the classification data to a plurality of other vehicles;

initiating, by the backend-device, a classification of the classification data by the vehicle-side classifier of each of the plurality of other vehicles;

receiving, by the backend-device, classification results from the plurality of other vehicles;

applying a voting scheme for the classification results and setting the classification result that the voting scheme has been voted for as a consistent annotation for the classification object;

communicating, by the backend-device, the consistent annotation to the vehicle or another vehicle; and initiating, by the backend-device; a training of the vehicle-side classifier of the vehicle or another vehicle based on the classification data and the determined consistent annotation for the classification object.

12. A Backend-Device comprising:

a receiver configured to receive classification data along with a respective classification result generated by a vehicle-side classifier of at least one vehicle; and one or more processors configured to implement a backend-side classifier and configured to train the backend-side classifier using the classification data and a possibly corrected respective classification result as annotation;

wherein the one or more processors are configured to compare classification results for the same classification object received from a plurality of vehicles; and if the classification results differ, to apply a consistency check on the classification results to determine an inconsistent or false classification result; and to train the backend-side classifier only using consistent annotations based on the consistency check.

13. A system comprising:
a backend-device including a receiver configured to receive classification data along with a respective classification result generated by a vehicle-side classifier of at least one vehicle; and one or more processors configured to implement a backend-side classifier and configured to train the backend-side classifier using the classification data and a possibly corrected respective classification result as annotation; and
one or more vehicles each comprising a vehicle side classifier;
wherein the backend-device is further configured to communicate a consistent annotation back to a vehicle in which an inconsistent or false classification result originates and wherein the backend-device is further configured to initiate an update of the vehicle-side classifier of the vehicle in which the inconsistent or false classification result originates based on the consistent annotation.

* * * * *